(12) United States Patent
Poirier et al.

(10) Patent No.: US 12,244,800 B2
(45) Date of Patent: Mar. 4, 2025

(54) CODING TREE PARTITIONING

(71) Applicant: InterDigital Madison Patent Holdings, SAS, Paris (FR)

(72) Inventors: Tangi Poirier, Cesson-Sevigne (FR); Franck Galpin, Cesson-Sevigne (FR); Fabrice Urban, Cesson-Sevigne (FR); Fabrice LeLeannec, Betton (FR); Philippe De LaGrange, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 449 days.

(21) Appl. No.: 17/619,440

(22) PCT Filed: Sep. 18, 2020

(86) PCT No.: PCT/EP2020/076066
§ 371 (c)(1),
(2) Date: Dec. 15, 2021

(87) PCT Pub. No.: WO2021/058380
PCT Pub. Date: Apr. 1, 2021

(65) Prior Publication Data
US 2022/0321883 A1    Oct. 6, 2022

(30) Foreign Application Priority Data

Sep. 23, 2019  (EP) .................................. 19306169
Sep. 27, 2019  (EP) .................................. 19290094
Oct. 7, 2019   (EP) .................................. 19306298

(51) Int. Cl.
*H04N 19/119*   (2014.01)
*H04N 19/176*   (2014.01)
*H04N 19/96*    (2014.01)

(52) U.S. Cl.
CPC ......... *H04N 19/119* (2014.11); *H04N 19/176* (2014.11); *H04N 19/96* (2014.11)

(58) Field of Classification Search
CPC .... H04N 19/176; H04N 19/70; H04N 19/119; H04N 19/96; H04N 19/159;
(Continued)

(56) References Cited

U.S. PATENT DOCUMENTS

2019/0116373 A1    4/2019  Li et al.

FOREIGN PATENT DOCUMENTS

| EP | 3270593 A2 | 1/2018 |
| JP | 2022501978 A | 1/2022 |
| WO | WO2020005752 A1 | 1/2020 |

OTHER PUBLICATIONS

Benjamin et al. ("Versatile Video Coding (Draft 6)", Joint Video Experts Team (JVET) of ITU-T SG 16 WP 3 and ISO/IEC JTC 1/SC 29/WG 11 15th Meeting: Gothenburg, SE, Jul. 3-12, 2019.*
(Continued)

*Primary Examiner* — Masum Billah
(74) *Attorney, Agent, or Firm* — Xiaoan Lu

(57) ABSTRACT

To encode a picture, a coding tree unit (CTU) in the picture is partitioned by a quadtree structure, and the quadtree leaf nodes can be further partitioned by a multi-type tree (MTT) structure. To increase the set of reachable coding tree nodes and leaves, we propose to increase the maximum allowed MTT hierarchy depth to be twice the difference between the CTU size and the minimum allowed size for a CU. The maximum allowed MTT hierarchy depth can be specified for all QT levels in order to provide more flexibility in the split tree. Alternatively, only two levels of maximum allowed MTT depth are signaled: one when QT splits are allowed, and another one when no more QT splits are allowed. In addition, an upper bound can be set for the minimum
(Continued)

allowed coding block size, based on the coding tree unit size or the maximum allowed transform size.

16 Claims, 9 Drawing Sheets

(58) Field of Classification Search
CPC .... H04N 19/105; H04N 19/593; H04N 19/11; H04N 19/132
USPC ........................................................ 375/240
See application file for complete search history.

(56) References Cited

OTHER PUBLICATIONS

Chih-Wei et al. ("Description of SDR video coding technology proposal by Media Tek", Joint Video Experts Team (JVET) of ITU-T SG 16 WP 3 and ISO/IEC JTC 1/SC 29/WG 11 10th Meeting: San Diego, US, Apr. 10-20, 2018, listed in IDS) (Year: 2018).*
Hsu et al., "Description of SDR video coding technology proposal by MediaTek", Document: JVET-J0018, Joint Video Experts Team (JVET) of ITU-T SG 16 WP3 and ISO/IEC JTC 1/SC 29/WG 11, 10th Meeting: San Diego, CA, US, pp. 1-64, Apr. 10-20, 2018.
Bross et al., " Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, pp. 1-455, Jul. 3-12, 2019.

* cited by examiner

CODING TREE PARTITIONING

This application claims the benefit, under 35 U.S.C. § 371 of International Application No. PCT/EP2020/076066, filed Sep. 18, 2020, which was published on Apr. 1, 2021, which claims the benefit of European Patent Application Nos. EP19306169.4 filed Sep. 23, 2019, EP19290094.2 filed Sep. 27, 2021 and EP19306298.1 filed Oct. 7, 2019.

TECHNICAL FIELD

The present embodiments generally relate to a method and an apparatus for coding tree partitioning in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

To encode a picture, a coding tree unit (CTU) in the picture is partitioned by a quadtree structure, and the quadtree leaf nodes can be further partitioned by a multi-type tree (MTT) structure. To increase the set of reachable coding tree nodes and leaves, we propose to increase the maximum allowed MTT hierarchy depth to be twice the difference between the CTU size and the minimum allowed size for a CU. The maximum allowed MTT hierarchy depth can be specified for all QT levels in order to provide more flexibility in the split tree. Alternatively, only two levels of maximum allowed MTT depth are signaled: one when QT splits are allowed, and another one when no more QT splits are allowed. In addition, an upper bound can be set for the minimum allowed coding block size, based on the coding tree unit size or the maximum allowed transform size. Moreover, flags can be used to indicate whether a binary tree (BT) is allowed and whether a ternary tree (TT) is enabled for the MTT. The flags indicating whether BT or TT is enabled can be sent individually for the intra/inter slices and luma/chroma components.

DETAILED DESCRIPTION

Figure 1:
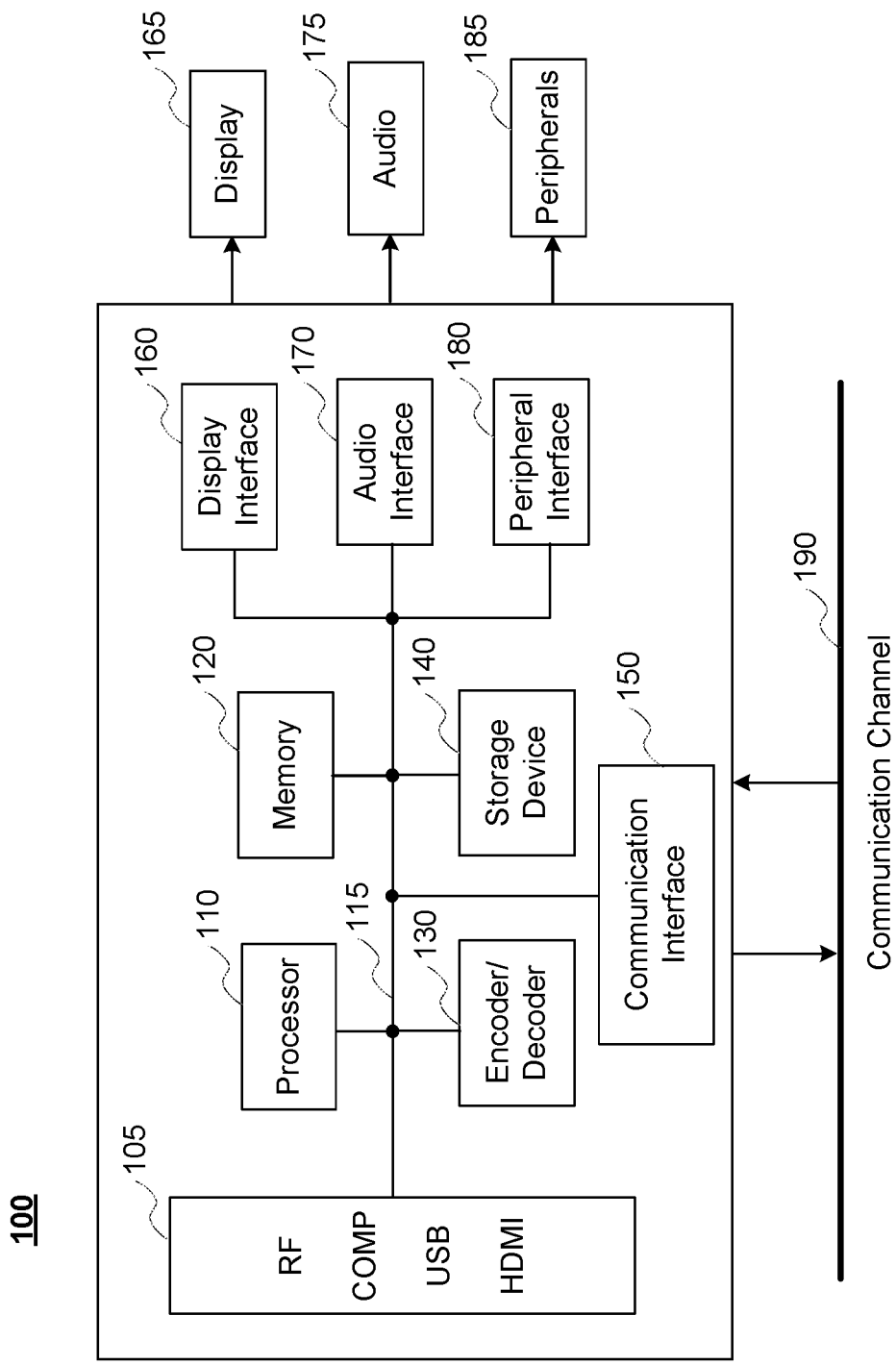
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
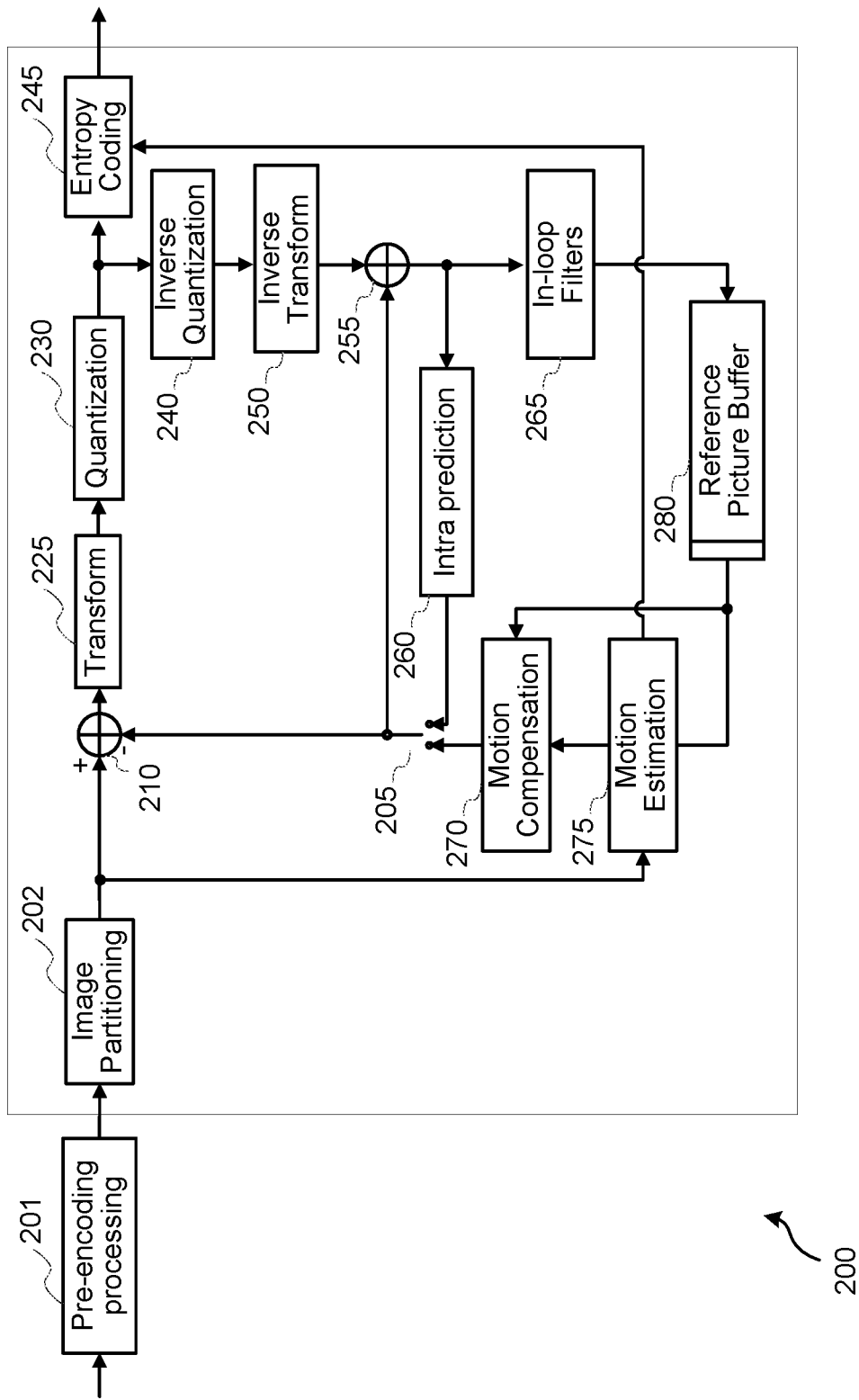
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (202), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

Figure 4:
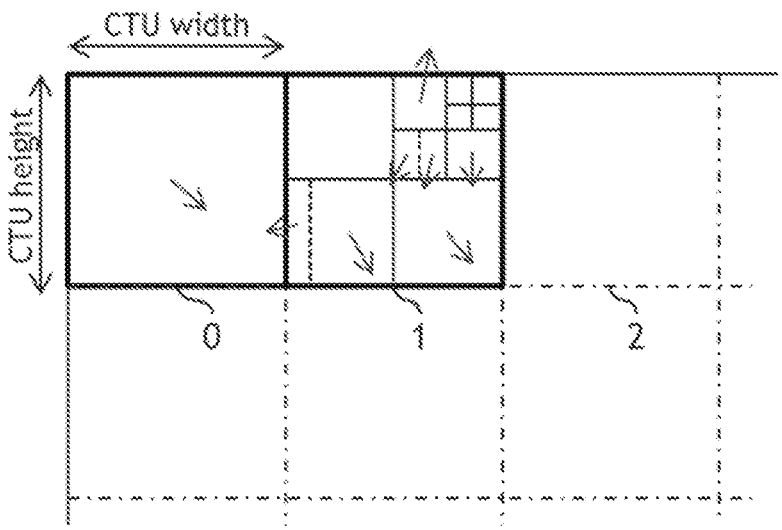
FIG. 4 illustrates a CTU split into CUs in accordance with the HEVC standard.
Figure 5:
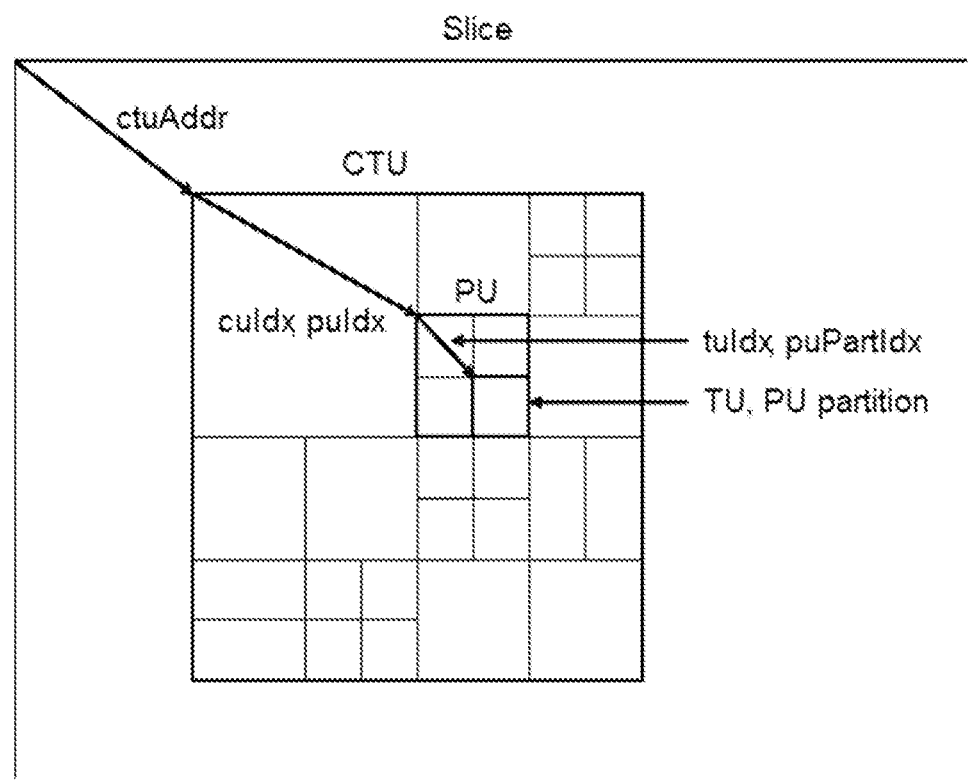
FIG. 5 illustrates the splitting of a CTU into CUs, PUs and TUs in accordance with the HEVC standard.

For coding according to HEVC, a picture is partitioned into coding tree blocks (CTB) of square shape with a configurable size (typically at 64×64, 128×128, or 256×256 pixels), and a consecutive set of coding tree blocks is grouped into a slice. A Coding Tree Unit (CTU), also referred to as the Largest Coding Unit (LCU), contains the CTBs of the encoded color components. A CTB (also referred to as the largest coding block, LCB) is the root of a quadtree partitioning into Coding Blocks (CB) as illustrated in FIG. 4, and a Coding Block may be partitioned into one or more Prediction Blocks (PB) and forms the root of a quadtree partitioning into Transform Blocks (TBs), as illustrated in FIG. 5.

Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB and TB. In addition, the term "block" can also be used to refer to a macroblock and a partition as specified in H.264/AVC or other video coding standards, and more generally to refer to an array of data of various sizes.

In the encoder 200, a picture is encoded by the encoder elements as described below. The picture to be encoded is processed in units of, for example, CUs. Each coding unit is encoded using either an intra or inter mode. When a coding unit is encoded in an intra mode, it performs intra prediction (260). In an inter mode, motion estimation (275) and compensation (270) are performed. The encoder decides (205) which one of the intra mode or inter mode to use for encoding the coding unit, and indicates the intra/inter decision by a prediction mode flag. Prediction residuals are calculated by subtracting (210) the predicted block from the original image block.

The prediction residuals are then transformed (225) and quantized (230). The quantized transform coefficients, as well as motion vectors and other syntax elements, are entropy coded (245) to output a bitstream. As a non-limiting example, context-based adaptive binary arithmetic coding (CABAC) can be used to encode syntax elements into the bitstream.

The encoder may also skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture, for example, to perform deblocking/SAO (Sample Adaptive Offset) filtering to reduce encoding artifacts. The filtered image is stored at a reference picture buffer (280).

Figure 3:
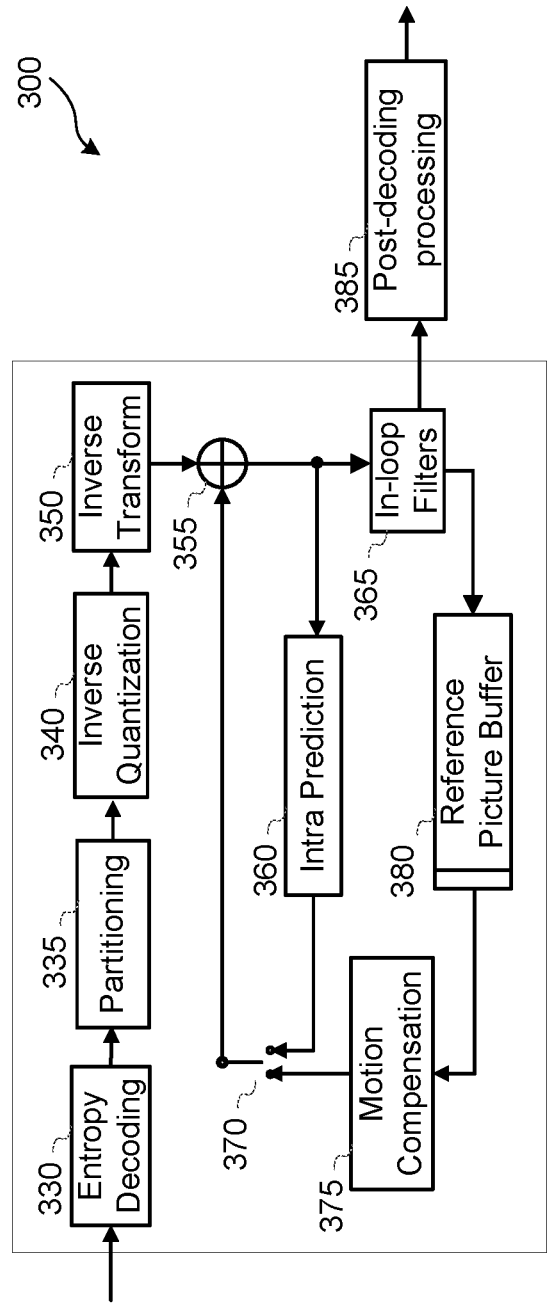
FIG. 3 illustrates a block diagram of an embodiment of a video decoder.

FIG. 3 illustrates a block diagram of an example video decoder 300, such as an HEVC decoder. In the decoder 300, a bitstream is decoded by the decoder elements as described below. Video decoder 300 generally performs a decoding pass reciprocal to the encoding pass as described in FIG. 2, which performs video decoding as part of encoding video data. FIG. 3 may also illustrate a decoder in which improvements are made to the HEVC standard or a decoder employing technologies similar to HEVC, such as a VVC decoder.

In particular, the input of the decoder includes a video bitstream, which may be generated by video encoder 200. The bitstream is first entropy decoded (330) to obtain transform coefficients, motion vectors, picture partitioning information, and other coded information. The picture partitioning information indicates how the picture is partitioned, for example, the size of the CTUs, and a manner a CTU is split into CUs, and possibly into PUs when applicable. The decoder may therefore divide (335) the picture, for example, into CTUs, and each CTU into CUs, according to the decoded picture partitioning information. The transform coefficients are de-quantized (340) and inverse transformed (350) to decode the prediction residuals.

Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing may use metadata derived in the pre-encoding processing and signaled in the bitstream.

New video compression tools in VVC include a Coding Tree Unit representation in the compressed domain, which can represent picture data in a more flexible way. In VVC, a quadtree with nested multi-type tree (MTT) using binary and ternary splits segmentation structure replaces the concepts of multiple partition unit types, i.e., VVC removes the separation of the CU, PU and TU concepts except in several special cases. In the VVC coding tree structure, a CU can have either a square or rectangular shape. A coding tree unit (CTU) is first partitioned by a quadtree structure. Then the quadtree leaf nodes can be further partitioned by a multi-type tree structure.

Figure 6:
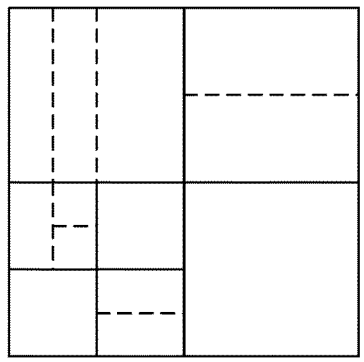
FIG. 6 illustrates the Quad-Tree plus Binary-Tree (QTBT) CTU representation in VVC.
Figure 6:
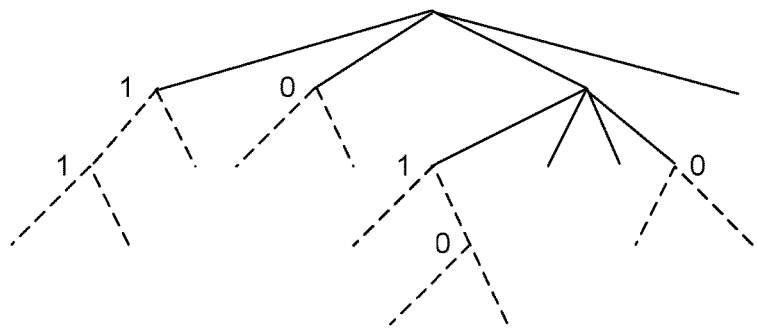

In particular, the tree decomposition of a CTU is proceeded in different stages: first the CTU is split in a quadtree fashion, then each quadtree leaf can be further divided in a binary or ternary fashion. This is illustrated on the right of FIG. 6 where solid lines represent the quadtree decomposition phase and dashed lines represent the binary decomposition that is spatially embedded in the quadtree leaves. In intra slices, when the dual tree mode is activated, the Luma and Chroma block partitioning structure is separated, and decided independently.

Figure 7:
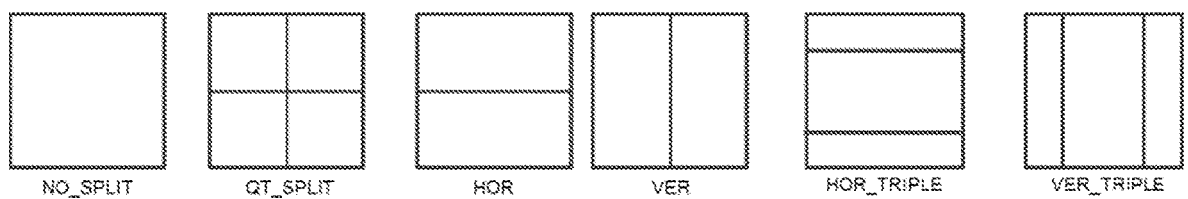
FIG. 7 illustrates the set of all coding unit splitting modes supported in VVC draft 6.

As shown in FIG. 7, there are four splitting types in multi-type tree structure, vertical binary splitting (VER), horizontal binary splitting (HOR), vertical ternary splitting (VER_TRIPLE), and horizontal ternary splitting (HOR_TRIPLE). The HOR_TRIPLE or VER_TRIPLE splitting (horizontal or vertical triple tree splitting mode) consists in dividing a coding unit (CU) into 3 sub-coding-units (sub-CUs), with respective sizes equal to ¼, ½ and ¼ of the parent CU size in the direction of the considered spatial division.

The multi-type tree leaf nodes are called coding units (CUs), and except in several special cases, this segmentation is used for prediction and transform processing without any further partitioning. The exception occurs in the following conditions:

If a CU is larger than 64 in width or height, a tiling of the CU into TU of size equal to the maximum supported transform size is performed. Typically, the maximum transform size may be equal to 64.

If an intra CU is coded in the ISP (intra sub-partition) mode, the CU is split into 2 or 4 transform units, depending of the type of ISP mode used and the shape of the CU.

If an inter CU is coded in SBT (sub-block transform) mode, the CU is split into 2 transform units, one of the resulting TU having necessarily residual data equal to zero.

If an inter CU is coded in Triangle Prediction Merge (TPM) mode, the CU is made of 2 triangular prediction units, each PU being assigned its own motion data.

According to VVC draft 6, syntax related to the splits is coded in the Sequence Parameter Set (SPS). If partition_constraints_override_enabled_flag is true, the syntax relating to partitioning may be overridden in the slice header (SH). SPS syntax and SH syntax used in VVC draft 6 are shown in Table 1 and Table 2

TABLE 1

| Sequence Parameter Set syntax in VVC draft 6 | |
| --- | --- |
| | Descriptor |
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   ... | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |

TABLE 1-continued

Sequence Parameter Set syntax in VVC draft 6

| | Descriptor |
|---|---|
| sps_max_mtt_hierarchy_depth_intra_slice_chroma | ue(v) |
| if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| ... | |

The semantics of some SPS syntax elements is described in the following:

log2_ctu_size_minus5 plus 5 specifies the luma coding tree block size of each CTU. It is a requirement of bitstream conformance that the value of log2_ctu_size_minus5 be less than or equal to 2.

log2_min_luma_coding_block_size_minus2 plus 2 specifies the minimum luma coding block size.

The variables CtbLog2SizeY, CtbSizeY, MinCbLog2SizeY, MinCbSizeY, IbcBufWidthY, IbcBufWidthC and Vsize are derived as follows:

$$CtbLog2SizeY = log2\_ctu\_size\_minus5 + 5 \quad (7\text{-}15)$$

$$CtbSizeY = 1 << CtbLog2SizeY \quad (7\text{-}16)$$

$$MinCbLog2SizeY = log2\_min\_luma\_coding\_block\_size\_minus2+2) \quad (7\text{-}17)$$

$$MinCbSizeY = 1 << MinCbLog2SizeY \quad (7\text{-}18)$$

$$IbcBufWidthY = 128*128/CtbSizeY \quad (7\text{-}19)$$

$$IbcBufWidthC = IbcBufWidthY/SubWidthC \quad (7\text{-}20)$$

$$VSize = Min(64, CtbSizeY) \quad (7\text{-}21)$$

The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

$$CtbWidthC = CtbSizeY/SubWidthC \quad (7\text{-}22)$$

$$CtbHeightC = CtbSizeY/SubHeightC \quad (7\text{-}23)$$

sps_log2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_flag is equal to 1, the default difference can be overridden by slice_log2_diff_min_qt_min_cb_luma present in the slice header of the slices referring to the SPS. The value of sps_log2_diff_min_qt_min_cb_intra_slice_luma shall be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$$MinQtLog2SizeIntraY = sps\_log2\_diff\_min\_qt\_min\_cb\_intra\_slice\_luma + MinCbLog2SizeY \quad (7\text{-}24)$$

sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_flag is equal to 1, the default difference can be overridden by slice_log2_diff_min_qt_min_cb_luma present in the slice header of the slices referring to the SPS. The value of sps_log2_diff_min_qt_min_cb_inter_slice shall be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$$MinQtLog2SizeInterY = sps\_log2\_diff\_min\_qt\_min\_cb\_inter\_slice + MinCbLog2SizeY \quad (7\text{-}25)$$

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_inter_slice shall be in the range of 0 to CtbLog2SizeY−MinCbLog2SizeY, inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_intra_slice_luma shall be in the range of 0 to CtbLog2SizeY−MinCbLog2SizeY, inclusive.

sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_flag is equal to 1, the default difference can be overridden by slice_log2_diff_max_bt_min_qt_luma present in the slice header of the slices referring to the SPS. The value of sps_log2_diff_max_bt_min_qt_intra_slice_luma shall be in the range of 0 to CtbLog2SizeY−MinQtLog2SizeIntraY, inclusive. When sps_log2_diff_max_bt_min_qt_ intra_slice_luma is not present, the value of sps_log2_diff_max_bt_min_qt_intra_slice_luma is inferred to be equal to 0.

sps_log2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_flag is equal to 1, the default difference can be overridden by slice_log2_diff_max_tt_min_qt_luma present in the slice header of the slices referring to the SPS. The value of sps_log2_diff_max_tt_min_qt_intra_slice_luma shall be in the range of 0 to CtbLog2SizeY−MinQtLog2SizeIntraY, inclusive. When sps_log2_diff_max_tt_min_qt_intra_slice_luma is not present, the value of sps_log2_diff_max_tt_min_qt_intra_slice_luma is inferred to be equal to 0.

sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log2_diff_max_bt_min_qt_luma present in the slice header of the slices referring to the SPS. The value of sps_log2_diff_max_bt_min_qt_inter_slice shall be in the range of 0 to CtbLog2SizeY−MinQtLog2SizeInterY, inclusive. When sps_log2_diff_max_bt_min_qt_inter_slice is not present, the value of sps_log2_diff_max_bt_min_qt_inter_slice is inferred to be equal to 0.

sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log2_diff_max_tt_min_qt_luma present in the slice header of the slices referring to the SPS. The value of sps_log2_diff_max_tt_min_qt_inter_slice shall be in the range of 0 to CtbLog2SizeY−MinQtLog2SizeInterY, inclusive. When sps_log2_diff_max_tt_min_qt_inter_slice is not present, the value of sps_log2_diff_max_tt_min_qt_inter_slice is inferred to be equal to 0.

sps_log2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_flag is equal to 1, the default difference can be overridden by slice_log2_diff_min_qt_min_cb_chroma present in the slice header of the slices referring to the SPS. The value of sps_log2_diff_min_qt_min_cb_intra_slice_chroma shall be in the range of 0 to CtbLog2SizeY−MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$\text{MinQtLog2SizeIntra}C = \text{sps\_log2\_diff\_min\_qtmin\_cb\_intraslice\_chroma} + \text{MinCbLog2SizeY} \qquad (7\text{-}26)$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_flag is equal to 1, the default maximum hierarchy depth can be overridden by slice_max_mtt_hierarchy_depth_chroma present in the slice header of the slices referring to the SPS. The value of sps_max_mtt_hierarchy_depth_intra_slice_chroma shall be in the range of 0 to CtbLog2SizeY−MinCbLog2SizeY, inclusive. When not present, the value of sps_max_mtt_hierarchy_depth_intra_slice_chroma is inferred to be equal to 0.

sps_log2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log2_diff_max_bt_min_qt_chroma present in the slice header of the slices referring to the SPS. The value of sps_log2_diff_max_bt_min_qt_intra_slice_chroma shall be in the range of 0 to CtbLog2SizeY−MinQtLog2SizeIntraC, inclusive. When sps_log2_diff_max_bt_min_qt_intra_slice_chroma is not present, the value of sps_log2_diff_max_bt_min_qt_intra_slice_chroma is inferred to be equal to 0.

sps_log2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log2_diff_max_tt_min_qt_chroma present in the slice header of the slices referring to the SPS. The value of sps_log2_diff_max_tt_min_qt_intra_slice_chroma shall be in the range of 0 to CtbLog2SizeY−MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTbLog2SizeY, MaxTbLog2SizeY, MinTbSizeY, and MaxTbSizeY are derived as follows:

$$MinTbLog2SizeY=2 \quad (7\text{-}27)$$

$$MaxTbLog2SizeY=\text{sps\_max\_luma\_transform\_size\_64\_flag}?6:5 \quad (7\text{-}28)$$

$$MinTbSizeY=1<<MinTbLog2SizeY \quad (7\text{-}29)$$

$$MaxTbSizeY=1<<MaxTbLog2SizeY \quad (7\text{-}30)$$

TABLE 2

Slice Header syntax in VVC Draft 6

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   non_reference_picture_flag | u(1) |
|   slice_type | ue(v) |
|   ... | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma != 0 ) | |
|         slice_log2_diff_max_bt_min_qt_luma | ue(v) |
|         slice_log2_diff_max_tt_min_qt_luma | ue(v) |
|       } | |
|       if( slice_type == I && qtbtt_dual_tree_intra_flag ) | |
|       { | |
|         slice_log2_diff_min_qt_min_cb_chroma | ue(v) |
|         slice_max_mtt_hierarchy_depth_chroma | ue(v) |
|         if( slice_max_mtt_hierarchy_depth_chroma != 0 ) | |
|           slice_log2_diff_max_bt_min_qt_chroma | ue(v) |
|           slice_log2_diff_max_tt_min_qt_chroma | ue(v) |
|         } | |
|       } | |
|     } | |
|   } | |
|   ... | |
| } | |

In the following, the maximum allowed hierarchy depth of multi-type tree (max_mtt_hierarchy_depth) splitting from a quadtree leaf is described, using syntax element sps_ max_mtt_hierarchy_depth_inter_slice for the luma color component of the inter slice as an example. However, the present principles can also be applied to the intra slice or the chroma color component (for example, syntax elements sps_max_mtt_hierarchy_depth_intra_slice_luma and sps_log2_diff_min_qt_min_cb_intra_slice_chroma).

Figure 8:
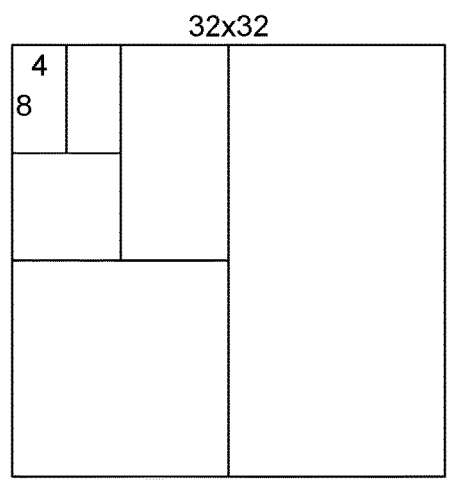
FIG. 8 illustrates that a 32×32 block is split using only BT with a depth of 5.

In VVC Draft 6, the value sps_max_mtt_hierarchy_depth_inter_slice shall be in the range of 0 to CtbLog2SizeY−MinCbLog2SizeY, inclusive. Typically MinCbLog2SizeY is equal to 2 corresponding to a 4×4 block and CtbLog2SizeY is equal to 7, corresponding to 128×128 CTU. In this configuration, the max_mtt_hierarchy_depth shall be in the range 0 to 5. If the minimum QT Size (i.e., 1<<MinQtLog2SizeInterY) is equal to 32 and only BT is used, the minimum block size that can be reached is 4×8 and 8×4 when the BT split depth is 5, as shown in FIG. 8. That is, the encoder lacks the flexibility to support the 4×4 block size in this example. More generally, the encoder would only support a subset of the split modes specified by VVC.

Figure 9:
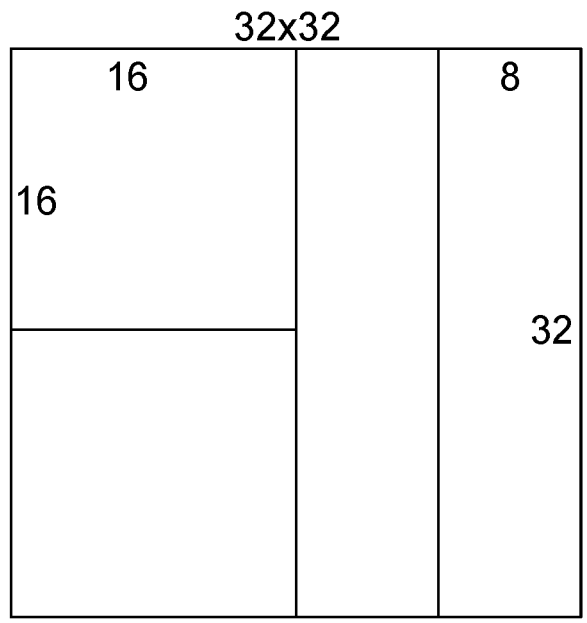
FIG. 9 illustrates that a 32×32 block is split using only BT with a depth of 2.
Figure 10:
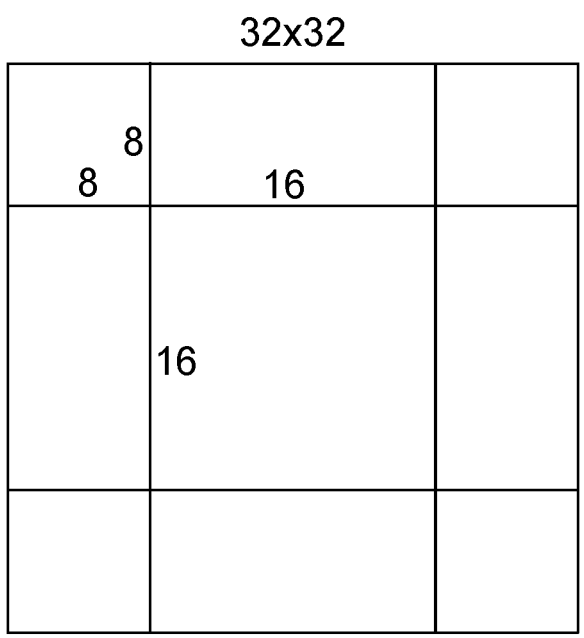
FIG. 10 illustrates that a 32×32 block is split using only TT with a depth of 2.

To highlight the lack of flexibility, we use a configuration where the CTU size is equal to 32, minimum Cb size is 8 and min QT size is 32. This means that only BT and TT can be used. In this configuration, max_mtt_hierarchy_depth is set to 2. If only BT is used, the minimum block size that can be reached is 16×16 or 8×32; if only TT is used, some region can only be split to 16×16, as shown in FIG. 9 and FIG. 10.

Figure 11:
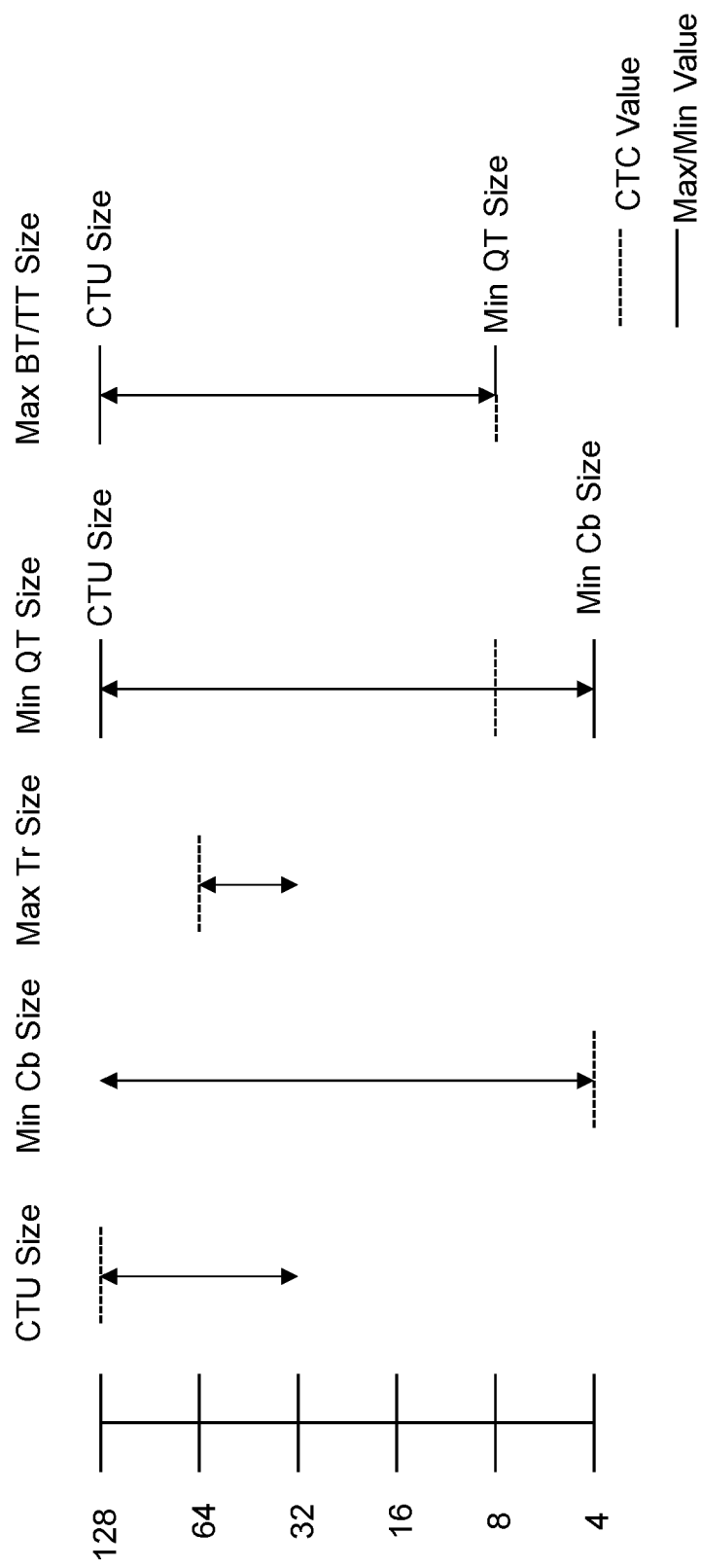
FIG. 11 illustrates the minimum, maximum and Common Test Conditions (CTC) values for split related syntax elements in VVC draft 6.

To better illustrate the syntax elements related to the splits, FIG. 11 illustrates the possible values for CTU size, minimum coded block size, maximum transform size, minimum QT size and maximum BT/TT size. The actual values used for Common Test Conditions (CTC) in VTM6.0 are also illustrated. We can see that the minimum coded block size (min_luma_coding_block_size) is only bounded by the CTU size.

As described above, the way the coding tree depth is normatively bounded, due to the combined use of the maximum block size for which BT or TT split is allowed and the maximum multi-type-tree hierarchy depth, makes the VVC compression scheme potentially sub-optimal in terms of coding efficiency, given a fixed maximum block size and a minimum block size. Another issue is that log2_min_luma_coding_block_size_minus2 syntax element is not related to other syntax element and has no maximum value. This may lead to a situation where an encoder generates a VVC bit-stream with a value of log2_min_luma_coding_block_size_minus2 which is higher than the maximum block size, making things non-consistent.

To address the lack of flexibility in VVC for the maximum split depth, the maximum Binary Tree (BT) size, the maximum Ternary Tree (TT) size and the maximum hierarchy depth information are defined for Intra slices and inter slices separately. In case of Dual Tree, max BT size/max TT size and max MTT depth are also defined for the Chroma tree in Intra slices. The proposed methods may increase the set of reachable coding tree nodes and leaves, under the constraint of pre-fixed maximum and minimum coded block sizes, and therefore improve the compression efficiency through a higher degree of flexibility in the allowed coding tree representation.

In one embodiment, the maximum value for sps_max_mtt_hierarchy_depth_inter_slice and sps_max_mtt_hierarchy_depth_intra_slice_luma are increased. In the following, for ease of notation, max_mtt_hierarchy_depth is used as a generic term to refer to syntax elements related to the maximum MTT hierarchy depth, for example, sps_max_mtt_hierarchy_depth_inter_slice and sps_max_mtt_hierarchy_depth_intra_slice_luma. In another embodiment, the max_mtt_hierarchy_depth is described for all available QT depths, in order to offer even more flexibility to describe the split tree. In another embodiment, the max_mtt_hierarchy_depth is different when QT split is available for a given depth and when QT split is unavailable for a given depth.

In another embodiment, syntax element sps_max_luma_transform_size_64_flag is moved to before log2_min_luma_coding_block_size_minus2 and to define a maximum value for coding block size (log2_min_luma_coding_block_size_minus2) depending on the maximum transform size (sps_max_luma_transform_size_64_flag).

In the following, different embodiments are described in further detail.

Maximum Hierarchy Depth in VVC Draft 6

In this embodiment, we propose to increase the allowed number of consecutive splits (i.e., split depth, or MTT hierarchy depth) to be twice the difference between the CTU size and the minimum size for a CU. With this increase, in the worst case where QT is not used (minimum QT defined as CTU size) and BT and TT are the only splits used, we can reach the minimum CU size.

The changes in the specification text are underlined in the following:

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtt_hierarchy_depth_inter_slice shall be in the range of 0 to 2*(CtbLog2SizeY−MinCbLog2SizeY), inclusive.

slice_max_mtt_hierarchy_depth_luma specifies the maximum hierarchy depth for coding units resulting from multi-type tree splitting of a quadtree leaf in the current slice. The value of slice_max_mtt_hierarchy_depth_luma shall be in the range of 0 to 2*(CtbLog2SizeY−MinCbLog2SizeY), inclusive. When not present, the value of slice_max_mtt_hierarchy_depth_luma is inferred as follows:

If slice_type equal to 2 (I), the value of slice_max_mtt_hierarchy_depth_luma is inferred to be equal to sps_max_mtt_hierarchy_depth_intra_slice_luma.

Otherwise (slice_type equal to 0 (B) or 1 (P)), the value of slice_max_mtt_hierarchy_depth_luma is inferred to be equal to sps_max_mtt_hierarchy_depth_inter_slice.

A reason for the value 2*(CtbLog2SizeY−MinCbLog2SizeY), instead of (CtbLog2SizeY−MinCbLog2SizeY) as specified in VVC draft 6, is that it allows reaching the minimum allowed block size, whatever the QT, BT or TT split type is used. In particular, it can be reached with binary tree (BT) splits only, which is not the case with the normative constraints currently specified in VVC draft 6. Therefore, the advantage of the proposed approach is that it maximizes the compression performance that can be achieved with a VVC encoder, under the constraint of a maximum and a minimum coded block sizes.

Adaptive Max MTT Depth

In this embodiment, the max_mtt_hierarchy_depth is normatively specified for all QT levels in order to provide more flexibility in the split tree. The advantage of specifying a maximum multi-type tree depth associated with each level that can be reached by a quadtree leaf is that it enables allocating the combinatory of the encoder rate distortion in a fine way. Indeed, the rate distortion search for an optimal coding tree implies a large combinatory of the encoder search space. It is thus of interest to fine tune the combinatory of the multi-type type coding tree search, so as to obtain a good trade-off between the encoder search over all combinatory and the compression performance. Allocating a maximum mtt hierarchy depth for each quadtree level provides a way to obtain a better trade-off between the RD search combinatory and the compression performance. Thus the higher degree of flexibility in the normative signaling of maximum mtt coding tree depth for each quadtree level potentially leads to encoder complexity/compression efficiency trade-offs that are currently not reachable with the VVC draft 6 specification.

TABLE 3

SPS specification with one maximum BT depth and one maximum TT depth signaled for each quadtree leaf where the binary or ternary tree splitting is allowed.

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   ...... | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   ~~sps_max_mtt_hierarchy_depth_inter_slice~~ | ~~ue(v)~~ |
|   ~~sps_max_mtt_hierarchy_depth_intra_slice_luma~~ | ~~ue(v)~~ |
|   <u>sps log2 diff max mtt size min qt size inter slice luma</u> | <u>ue(v)</u> |
|   <u>sps log2 diff max mtt size min qt size intra slice luma</u> | <u>ue(v)</u> |
|   <u>if (sps_log2_diff_max_mtt_size_min_qt_size_intra_slice_luma != 0 ) {</u> | |
|     ~~sps_log2_diff_max_bt_min_qt_intra_slice_luma~~ | ~~ue(v)~~ |
|     ~~sps_log2_diff_max_tt_min_qt_intra_slice_luma~~ | ~~ue(v)~~ |
|     <u>for(i=0; i<=sps_log2_diff_max_mtt_size_min_qt_size_intra_slice_luma; i++) {</u> | |
|       <u>sps max bt depth intra slice luma[i]</u> | <u>ue(v)</u> |
|       <u>sps max tt depth intra slice luma[i]</u> | <u>ue(v)</u> |
|     <u>}</u> | |
|   <u>}</u> | |
|   <u>if (sps_log2_diff_max_mtt_size_min_qt_size_inter_slice_luma != 0 ) {</u> | <u>ue(v)</u> |
|     ~~sps_log2_diff_max_bt_min_qt_inter_slice~~ | ~~ue(v)~~ |
|     ~~sps_log2_diff_max_tt_min_qt_inter_slice~~ | ~~ue(v)~~ |
|     <u>for(i=0; i<=sps_log2_diff_max_mtt_size_min_qt_size_inter_slice_luma; i++) {</u> | |
|       <u>sps max bt depth inter slice luma[i]</u> | <u>ue(v)</u> |
|       <u>sps max tt depth inter slice luma[i]</u> | <u>ue(v)</u> |
|     <u>}</u> | |
|   <u>}</u> | |

TABLE 3-continued

SPS specification with one maximum BT depth and one maximum TT depth signaled
for each quadtree leaf where the binary or ternary tree splitting is allowed.

| | Descriptor |
|---|---|
| if( qtbtt_dual_tree_intra_flag ) { | |
|   sps_log2_diff_min_qt_min_cb_intra_slice_chroma | ue(v) |
|   ~~sps_max_mtt_hierarchy_depth_intra_slice_chroma~~ | ~~ue(v)~~ |
|   ~~if(sps_max_mtt_hierarchy_depth_intra_slice_chroma !=0){~~ | |
|     ~~sps_log2_diff_max_bt_min_qt_intra_slice_chroma~~ | ~~ue(v)~~ |
|     ~~sps_log2_diff_max_tt_min_qt_intra_slice_chroma~~ | ~~ue(v)~~ |
|   ~~}~~ | |
|   sps_log2_diff_max_mtt_size_min_qt_size_intra_slice_chroma | ue(v) |
|   if (sps_log2_diff_max_mtt_size_min_qt_size_intra_slice_chroma != 0 ) { | |
|     for(i=0; i<= sps_log2_diff_max_mtt_size_min_qt_size_intra_slice_chroma; i++) { | |
|       sps_max_bt_depth_intra_slice_chroma[i] | ue(v) |
|       sps_max_tt_depth_intra_slice_chroma[i] | ue(v) |
|     } | |
|   } | |
| } | |

Here, we first signal the syntax element that indicates what is the maximum size at which the mtt tree can start, relatively to the minimum quadtree size, sps_log2_diff_max_mtt_size_min_qt_size_inter_slice_luma. The maximum size where the mtt can start is deduced as:

max_mtt_size=1<<
  (sps_log2_diff_max_mtt_size_min_qt_size_inter_slice_luma+
  MinQtLog2SizeInterY).

The maximum value of sps_log2_diff_max_mtt_size_min_qt_size_inter_slice_luma is CtbLog2SizeY−MinQtLog2SizeInterY.

If sps_log2_diff_max_mtt_size_min_qt_size_inter_slice_luma is equal to 0, it means that no mtt split are allowed. If not null, then for each QT level for which mtt is allowed, the max depths for both BT and TT are signaled. For each level, the allowed range of sps_max_bt_depth_inter_slice_luma[i] is from 0 to 2×(i+MinQtLog2SizeInterY−MinCbLog2SizeY). This last value corresponding to twice the difference between the log2 of the quad-tree leaf node size currently considered and the log2 of the minimum coded block size. It ensures that the minimum coded block size can be reached by means of binary tree splits.

In one example, we can define a split tree as follows in VVC:

TABLE 4

Maximum MTT depth for each size

| CU size | QT split allowed? | Max MTT depth |
|---|---|---|
| 128 | Yes | 0 |
| 64 | Yes | 0 |
| 32 | Yes | 2 |
| 16 | Yes | 4 |
| 8 | No | 2 |
| 4 | No | 0 |

By signaling the following values:
log2_ctu_size_minus5=2 (CTU size is 128)
log2_min_luma_coding_block_size_minus2=0 (minimum CU size is 4)
sps_log2_diff_min_qt_min_cb_intra_slice_luma=1 (minimum CU size resulting from for QT split is 8)
sps_log2_diff_max_mtt_size_min_qt_size=2 (maximum CU size for mtt split is 32)
sps_max_bt_depth_inter_slice_luma[0]=2 (2 BT splits allowed for 8×8 CU)
sps_max_bt_depth_inter_slice_luma[1]=4 (4 BT splits allowed for 16×16 CU)
sps_max_bt_depth_inter_slice_luma[2]=2 (2 BT splits allowed for 32×32 CU)

The same principle applies to intra_slice_luma and intra_slice_chroma.

In another embodiment, a maximum allowed hierarchy depth is normatively specified for multi-type tree splitting of a quadtree leaf, associated with each quadtree level at which BT or TT splitting a quadtree leaf is allowed. Basically, a coding unit corresponding to a quadtree leaf for which MTT split is necessarily a square CU with a size whose log2 is comprised between MinQtLog2SizeIntraY and (MinQtLog2SizeIntraY+log2_diff_max_mtt_min_qt_intra_slice_luma).

Here we define log2_diff_max_mtt_min_qt_intra_slice_luma by the maximum value between the signaled values sps_log2_diff_max_bt_min_qt_intra_slice_luma and sps_log2_diff_max_tt_min_qt_intra_slice_luma. For each block size whose log2 is comprised between MinQtLog2SizeIntraY and (MinQtLog2SizeIntraY+log2_diff_max_mtt_min_qt_intra_slice_luma) a maximum multi-type tree depth is signaled.

The value sps_max_mtt_hierarchy_depth_intra_slice_luma[i] specifies the maximum hierarchy depth of the multi-type tree for spitting a CU that corresponds to a quadtree leaf.

TABLE 5

| | Descriptor |
|---|---|
| seq_parameter_set_rbsp( ) { | |
|   ... | |
|   if( ChromaArrayType != 0 ) | |
|     qtbtt_dual_tree_intra_flag | u(1) |

TABLE 5-continued

| | Descriptor |
|---|---|
| log2_ctu_size_minus5 | u(2) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| ~~sps max mtt hierarchy depth inter slice~~ | ~~ue(v)~~ |
| ~~sps max mtt hierarchy depth inter slice~~ | ~~ue(v)~~ |
| sps max mtt hierarchy depth intra slice luma present flag | ue(1) |
| sps max mtt hierarchy depth inter slice luma present flag | ue(1) |
| ~~if( sps_max_mtt_hierarchy_depth_intra_slice_luma != 0 ) {~~ | |
| if( sps_max_mtt_hierarchy_depth_intra_slice_luma_present_flag != 0 ) { | |
|    sps_log2_diff_max_bt_min_qt_intra_slice_luma | ue(v) |
|    sps_log2_diff_max_tt_min_qt_intra_slice_luma | ue(v) |
|    for(i= 0 ; i <= log2_diff_max_mtt_min_qt_intra_slice_luma ; i++) { | |
|      sps max mtt hierarchy depth intra slice luma[i] | ue(v) |
|    } | |
| } | |
| ~~if( sps_max_mtt_hierarchy_depth_inter_slices != 0 ) {~~ | |
| if( sps_max_mtt_hierarchy_depth_inter_slices_present_flag != 0 ) { | |
|    sps_log2_diff_max_bt_min_qt_inter_slice | ue(v) |
|    sps_log2_diff_max_tt_min_qt_inter_slice | ue(v) |
|    for(i= 0 ; i <= log2_diff_max_mtt_min_qt_inter_slice; i++) { | |
|      sps max mtt hierarchy depth inter slice[i] | ue(v) |
|    } | |
| } | |
| if( qtbtt_dual_tree_intra_flag ) { | |
|    sps_log2_diff_min_qt_min_cb_intra_slice_chroma | ue(v) |
|    ~~sps max mtt hierarchy depth intra slice chroma~~ | ~~ue(v)~~ |
|    sps max mtt hierarchy depth intra slice chroma present flag | ue(v) |
|    ~~if( sps max mtt hierarchy depth intra slice chroma != 0 ) {~~ | |
|    if ( sps_max_mtt_hierarchy_depth_intra_slice_chroma_present_flag != 0 ) { | |
|      sps_log2_diff_max_bt_min_qt_intra_slice_chroma | ue(v) |
|      sps_log2_diff_max_tt_min_qt_intra_slice_chroma | ue(v) |
|      for(i= 0 ; i <= log2_diff_max_mtt_min_qt_intra_slice_chroma; i++) { | |
|        sps max mtt hierarchy depth intra slice chroma[i] | ue(v) |
|      } | |
|    } | |
| } | |
| ... | |

In the same way as for log2_diff_max_mtt_min_qt_intra_slice_luma, the parameter log2_diff_max_mtt_min_qt_inter_slice is defined as the maximum value between the signaled values sps_log2_diff_max_bt_min_qt_inter_slice_luma and sps_log2_diff_max_tt_min_qt_inter_slice_luma. For each block size whose log2 is comprised between MinQtLog2SizeInterY and (MinQtLog2SizeInterY+ log2_diff_max_mtt_min_qt_inter_slice) a maximum multi-type tree depth is signaled.

In the same way as for log2_diff_max_mtt_min_qt_intra_slice_luma, the parameter log2_diff_max_mtt_min_qt_intra_slice_chroma is defined as the maximum value between the signaled values sps_log2_diff_max_bt_min_qt_intra_slice_chroma and sps_log2_diff_max_tt_min_qt_intra_slice_chroma. For each block size whose log2 is comprised between MinQtLog2SizeIntraC and (MinQtLog2SizeIntraC+ log2_diff_max_mtt_min_qt_intra_slice) a maximum multi-type tree depth is signaled.

According to a variant of the embodiment of Table 5, the syntax elements sps_max_mtt_hierarchy_depth_intra_slice_luma_present_flag, sps_max_mtt_hierarchy_depth_inter_slice_luma_present_flag and sps_max_mtt_hierarchy_depth_intra_slice_chroma_present_flag are not included in the SPS specification. This variant may take the form of the following Table 6.

TABLE 6

| | Descriptor |
|---|---|
| seq_parameter_set_rbsp( ) { | |
|   ... | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps max mtt hierarchy depth inter slice | ~~ue(v)~~ |
|   ~~sps max mtt hierarchy depth intra slice luma~~ | ~~ue(v)~~ |
|   ~~if( sps max mtt hierarchy depth intra slice luma != 0 ) {~~ | |
|     sps_log2_diff_max_bt_min_qt_intra_slice_luma | ue(v) |

TABLE 6-continued

|  | Descriptor |
|---|---|
| sps_log2_diff_max_tt_min_qt_intra_slice_luma | ue(v) |
| sps_log2_diff_max_bt_min_qt_inter_slice | ue(v) |
| sps_log2_diff_max_tt_min_qt_inter_slice | ue(v) |
|   for(i= 0 ; i <= log2_diff_max_mtt_min_qt_inter_slice ; i++) { | |
|     sps max mtt hierarchy depth inter slice[i] | ue(v) |
|   } | |
|   ~~if( sps_max_mtt_hierarchy_depth_intra_slices != 0 ) {~~ | |
| for(i= 0 ; i <= log2_diff_max_mtt_min_qt_intra_slice_luma; i++) { | |
|   sps max mtt hierarchy depth intra slice luma[i] | ue(v) |
| } | |
| if( qtbtt_dual_tree_intra_flag ) { | |
|   sps_log2_diff_min_qt_min_cb_intra_slice_chroma | ue(v) |
|   ~~sps_max_mtt_hierarchy_depth_intra_slice_chroma~~ | ~~ue(v)~~ |
|   ~~if ( sps_max_mtt_hierarchy_depth_intra_slice_chroma != 0 ) {~~ | |
|   sps_log2_diff_max_bt_min_qt_intra_slice_chroma | ue(v) |
|   sps_log2_diff_max_tt_min_qt_intra_slice_chroma | ue(v) |
|   for(i= 0 ; i <= log2_diff_max_mtt_min_qt_intra_slice_chroma; i++) { | |
|     sps max mtt hierarchy depth intra slice chroma[i] | ue(v) |
|   } | |
| } | |
| ... | |

In another variant, the coding of the maximum MTT hierarchy depth is indexed by the quad-tree depth instead of the log2 of quad-tree leaf size. This may take the slightly different form of Table 7.

In the variant of Table 7, the quantity strat_qt_depth_inter_slice is defined as:

$$\text{start\_qt\_depth\_inter\_slice} = \text{CtbLog2SizeY} - \max(\text{MaxBtLog2SizeY}, \text{MaxTtLog2SizeY})$$

where:

$$\text{MaxBtLog2SizeY} = (\text{MinQtLog2SizeInterY} + \text{sps\_log2\_diff\_max\_bt\_min\_qt\_inter\_slice})$$

$$\text{MaxTtLog2SizeY} = (\text{MinQtLog2SizeY} + \text{sps\_log2\_diff\_max\_bt\_min\_qt\_inter\_slice})$$

Moreover, max_qt_depth_inter_slice is defined as:

$$\text{max\_qt\_depth\_inter\_slice} = \text{CtbLog2SizeY} - \text{MinQtLog2SizeInterY}$$

The quantities start_qt_depth_intra_slice_luma, max_qt_depth_intra_slice_luma, start_qt_depth_intra_slice_chroma and max_qt_depth_intra_slice_chroma are defined in an analogous way as start_qt_depth_inter_slice and max_qt_depth_inter_slice, but for the case of intra slice Luma and intra slice Chrom (in case of dual tree), respectively.

TABLE 7

|  | Descriptor |
|---|---|
| seq_parameter_set_rbsp( ) { | |
|   ... | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   ~~sps_max_mtt_hierarchy_depth_inter_slice~~ | ~~ue(v)~~ |
|   ~~sps_max_mtt_hierarchy_depth_intra_slice_luma~~ | ~~ue(v)~~ |
|   ~~if(sps_max_mtt_hierarchy_depth_intra_slice_luma !=0){~~ | |
|   sps_log2_diff_max_bt_min_qt_intra_slice_luma | ue(v) |
|   sps_log2_diff_max_tt_min_qt_intra_slice_luma | ue(v) |
|   sps_log2_diff_max_bt_min_qt_inter_slice | ue(v) |
|   sps_log2_diff_max_tt_min_qt_inter_slice | ue(v) |
|     for(i= start_qt_depth_inter_slice; i <= max_qt_depth_inter_slice; i++) { | |
|       sps max mtt hierarchy depth inter slice[i] | ue(v) |
|   } | |
|   ~~if(sps_max_mtt_hierarchy_depth_inter_slices != 0){~~ | |
|   for(i= start_qt_depth_intra_slice_luma; i <= max_qt_depth_intra_slice_luma; i++) { | |
|     sps max mtt hierarchy depth intra slice luma[i] | ue(v) |
|   } | |
|   if( qtbtt_dual_tree_intra_flag ) { | |
|     sps_log2_diff_min_qt_min_cb_intra_slice_chroma | ue(v) |
|     ~~sps_max_mtt_hierarchy_depth_intra_slice_chroma~~ | ~~ue(v)~~ |
|     ~~if(sps_max_mtt_hierarchy_depth_intra_slice_chroma != 0){~~ | |
|     sps_log2_diff_max_bt_min_qt_intra_slice_chroma | ue(v) |

TABLE 7-continued

| | Descriptor |
|---|---|
| sps_log2_diff_max_tt_min_qt_intra_slice_chroma | ue(v) |
|   for(i= start_qt_depth_intra_slice_chroma; i <= max_qt_depth_intra_slice_chroma; i++) { | |
|     sps_max_mtt_hierarchy_depth_intra_slice_chroma[i] | ue(v) |
|   } | |
| } | |
| ... | |

In yet another embodiment, any of the preceding variants proposed here are also used in the coding of the slice header. Indeed, in VVC draft 6 specification, the coding tree parameters signaled in the SPS may be overridden in the slice header, for example, according to the syntax table as presented in Table 2.

Note that on the encoder side, the coded maximum MTT hierarchy depth may be upper-bounded according to the the depth difference between the log2 of the size of the quad-tree leaf node considered and the log2 of the size of the minimum coded block size. This may take the following form. Given the depth value i (index in one of the loops of Table 7) the maximum mtt hierarchy depth to encode may be upper bounded by the value 2*(CtbLog2SizeY-i-MinCbLog2SizeY), where 2*(CtbLog2SizeY-i-MinCbLog2SizeY) represents the number of splits needed in order to reach the minimum block size for both width and height using only BT split Indeed, exactly 2 symmetric binary split stages are needed to obtain a block with half size in width and height, from a given block to split. Clipping the value by the upper bound 2*(CtbLog2SizeY-i-MinCbLog2SizeY) may be beneficial in terms of bit saving for the coding of the SPS and slice header.

Moreover, note that normatively allowing the maximum mtt hierarchy depth to range from 0 to the value 2*(CtbLog2SizeY-i-MinCbLog2SizeY) ensures that the minimum coded block size can be reached by means of BT splits.

Finally, the proposed high level signaling of the maximum MTT hierarchy depth for each quad-tree level is taken into account during the CU-level decoder-side parsing process of the CU split information.

To do so, when to decoder evaluates if a given binary or ternary split mode is allowed for a current node of the coding tree of a given CTU, it compares the multi-type-tree depth of the current coding tree node and the maximum multi-type-tree depth, at the quad-tree depth associated with the current coding tree node. If the multi-type tree depth is higher or equal to the maximum allowed multi-type-tree depth at the considered quad-tree depth, then all binary and ternary split mode are forbidden for the current tree node. Thus, the decoder infers that the split mode of the considered tree node is different from any binary or ternary split mode.

The difference with the VVC draft 6 parsing process of the split information is that in VVC draft 6, the maximum allowed multi-type tree depth for a current tree node does not depend on the quad-tree depth associated with the considered coding tree node. It only depends on the slice type and component type in case of the intra slice type.

Binary/Ternary Split Enabling

In this embodiment, two new flags are introduced in the SPS to signal if BT and TT splits are used. Then if at least one of the two kinds of split is used, sps_max_mtt_hierarchy_depth syntax elements are coded as shown in Table 8. In the variant of embodiment of Table 8, sps_bt_enabled_flag is defined as:

sps_bt_enabled_flag equal to 1 specifies that binary splits are allowed in the process of coding block splitting.

TABLE 8

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   ...... | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_bt_enabled_flag | u(1) |
|   sps_tt_enabled_flag | u(1) |
|   if(sps_bt_enabled_flag || sps_tt_enabled_flag) { | |
|     sps_max_mtt_hierarchy_depth_inter_slice | ue(v) |
|     sps_max_mtt_hierarchy_depth_intra_slice_luma | ue(v) |
|   } | |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |

TABLE 8-continued

| | Descriptor |
|---|---|
|     sps_log2_diff_min_qt_min_cb_intra_slice_chroma | ue(v) |
|     if(sps_bt_enabled_flag \|\| sps_tt_enabled_flag) { | |
|       sps_max_mtt_hierarchy_depth_intra_slice_chroma | ue(v) |
|     } | |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
| } | |
| sps_max_luma_transform_size_64_flag | u(1) |

In another variant, BT and TT splits are enabled or disabled differently for intra luma, inter and intra chroma, to allow more flexibility. In the embodiment as shown in Table 9, sps_bt_enabled_flag is defined as:
sps_bt_enabled_flag equal to 1 specifies that binary splits are allowed in the process of coding block splitting of a quadtree leaf in slices with slice_type equal to 2 (I) referring to the SPS.

sps_max_mtt_hierarchy_depth syntax element. In a variant of Table 9, sps_log2_diff_max_bt_min_qt and sps_log2_diff_max_bt_min_qt are first defined, then sps_max_mtt_hierarchy_depth is conditionally parsed. The sps_log2_diff_max_bt_min_qt (sps_log2_diff_max_tt_min_qt) is changed to sps_log2_diff_max_bt_min_qt_plus_one

TABLE 9

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   ...... | |
|   if( ChromaArrayType != 0 ) | |
|     qtbtt_dual_tree_intra_flag | u(1) |
|   log2_ctu_size_minus5 | u(2) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_bt_enabled_flag_inter_slice | u(1) |
|   sps_tt_enabled_flag_inter_slice | u(1) |
|   if( sps_bt_enabled_flag_inter_slice \|\| sps_tt_enabled_flag_inter_slice) { | |
|     sps_max_mtt_hierarchy_depth_inter_slice | ue(v) |
|   } | |
|   sps_bt_enabled_flag_intra_slice_luma | |
|   sps_tt_enabled_flag_intra_slice_luma | |
|   if( sps_bt_enabled_flag_intra_slice_luma \|\| sps_tt_enabled_flag_intra_slice_luma) { | |
|     sps_max_mtt_hierarchy_depth_intra_slice_luma | ue(v) |
|   } | |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_bt_enabled_flag_intra_slice_chroma | |
|     sps_tt_enabled_flag_intra_slice_chroma | |
|     if(sps_bt_enabled_flag_intra_slice_chroma \|\| sps_tt_enabled_flag_intra_slice_chroma){ | |
|       sps_max_mtt_hierarchy_depth_intra_slice_chroma | ue(v) |
|     } | |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |

In another variant, sps_log2_diff_max_bt_min_qt or sps_log2_diff_max_tt_min_qt syntax element is used to disable BT or TT. In current VVC Draft 6, BT and TT splits are enabled together by setting a value greater than 0 to (sps_log2_diff_max_tt_min_qt_plus_one), the value 0 indicating that BT/TT is disabled. Indeed in this case the maximum BT size in strictly inferior to the minimum QT size, so it is never used. The sps_log2_diff_max_bt_min_qt_plus_one (sps_log2_diff_max_tt_min_qt_plus_one) syntax element is defined as:
sps_log2_diff_max_bt_min_qt_plus_one_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices plus one with slice_type equal to 2 (I) referring to the SPS. When partition_constraints_override_flag is equal to 1, the default difference can be overridden by slice_log2_diff_max_bt_min_qt_luma present in the slice header of the slices referring to the SPS. The value of sps_log2_diff_max_bt_min_qt_minus_one_intra_slice_luma shall be in the range of 0 to CtbLog2SizeY−MinQtLog2SizeIntraY+1, inclusive. When sps_log2_diff_max_bt_min_qt_minus_intra_slice_luma is not present, the value of sps_log2_diff_max_bt_min_qt_intra_slice_luma is inferred to be equal to 0.

TABLE 10

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   ... |  |
|   if( ChromaArrayType != 0 ) |  |
|     qtbtt_dual_tree_intra_flag | u(1) |
|     log2_ctu_size_minus5 | u(2) |
|     log2_min_luma_coding_block_size_minus2 | ue(v) |
|     partition_constraints_override_enabled_flag | u(1) |
|     sps_log2_diff_min_qt_min_cb_intra_slice_luma | ue(v) |
|     sps_log2_diff_min_qt_min_cb_inter_slice | ue(v) |
|     sps_log2_diff_max_bt_min_qt_plus_one_intra_slice_luma | ue(v) |
|     sps_log2_diff_max_tt_min_qt_plus_one_intra_slice_luma | ue(v) |
|     if( sps_log2_diff_max_bt_min_qt_plus_one_intra_slice_luma != 0 \|\| |  |
|       sps_log2_diff_max_tt_min_qt_plus_one_intra_slice_luma != 0) { |  |
|       sps_max_mtt_hierarchy_depth_intra_slice_luma | ue(v) |
|     } |  |
|     sps_log2_diff_max_bt_min_qt_plus_one_inter_slice | ue(v) |
|     sps_log2_diff_max_tt_min_qt_plus_one_inter_slice | ue(v) |
|     if( sps_log2_diff_max_bt_min_qt_plus_one_inter_slice != 0 \|\| |  |
|       sps_log2_diff_max_tt_min_qt_plus_one_inter_slice != 0) { |  |
|       sps_max_mtt_hierarchy_depth_inter_slice | ue(v) |
|     } |  |
|     if( qtbtt_dual_tree_intra_flag ) { |  |
|       sps_log2_diff_min_qt_min_cb_intra_slice_chroma | ue(v) |
|       sps_log2_diff_max_bt_min_qt_intra_slice_chroma | ue(v) |
|       sps_log2_diff_max_tt_min_qt_intra_slice_chroma | ue(v) |
|       if( sps_log2_diff_max_bt_min_qt_plus_one_intra_slice_chroma != 0 \|\| |  |
|         sps_log2_diff_max_tt_min_qt_plus_one_intra_slice_chroma != 0) { |  |
|         sps_max_mtt_hierarchy_depth_intra_slice_chroma |  |
|       } |  |
|     } |  |
|   sps_max_luma_transform_size_64_flag | u(1) |

Adaptive Max mtt Depth Simplified

In another variant, only 2 levels of max mtt depth are signaled (instead of 1 per QT level as in the previous embodiments): the max mtt depth when QT splits are allowed, and the max mtt depth when no more QT splits are allowed.

TABLE 11

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   ...... |  |
|   if( ChromaArrayType != 0 ) |  |
|     qtbtt_dual_tree_intra_flag | u(1) |
|     log2_ctu_size_minus5 | u(2) |
|     log2_min_luma_coding_block_size_minus2 | ue(v) |
|     partition_constraints_override_enabled_flag | u(1) |
|     sps_log2_diff_min_qt_min_cb_intra_slice_luma | ue(v) |
|     sps_log2_diff_min_qt_min_cb_inter_slice | ue(v) |
|     <u>sps max mtt hierarchy depth before minqt inter slice</u> | <u>ue(v)</u> |
|     <u>sps max mtt hierarchy depth before minqt intra slice luma</u> | <u>ue(v)</u> |
|     <u>if( sps_log2_diff_min_qt_min_cb_intra_slice_luma != 0) {</u> |  |

TABLE 11-continued

| | Descriptor |
|---|---|
|     <u>sps max mtt hierarchy depth after minqt intra slice luma</u> | <u>ue(v)</u> |
|   } | |
|   if( sps_max_mtt_hierarchy_depth_ before_minqt intra_slice_luma != 0 ) { | |
|     sps_log2_diff_max_bt_min_qt_ before_minqt intra_slice_luma | ue(v) |
|     sps_log2_diff_max_tt_min_qt_ before_minqt intra_slice_luma | ue(v) |
|   } | |
| <u>if( sps_log2_diff_min_qt_min_cb_inter_slice != 0) {</u> | |
|     <u>sps max mtt hierarchy depth after minqt inter slice</u> | <u>ue(v)</u> |
| <u>}</u> | |
|   if( sps_max_mtt_hierarchy_depth_ before_minqt inter_slice != 0 ) { | |
|     sps_log2_diff_max_bt_min_qt_ before_minqt inter_slice | ue(v) |
|     sps_log2_diff_max_tt_min_qt_ before_minqt inter_slice | ue(v) |
|   } | |
| ... | |
|   if( qtbtt_dual_tree_intra_flag ) { | |
|     sps_log2_diff_min_qt_min_cb_intra_slice_chroma | ue(v) |
|     sps max mtt hierarchy depth before minqt intra slice chroma | ue(v) |
|     <u>if( sps_log2_diff_min_qt_min_cb_intra_slice_chroma != 0) {</u> | |
|         <u>sps max mtt hierarchy depth after minqt intra slice chroma</u> | |
|     } | |
|     if ( sps_max_mtt_hierarchy_depth_intra_slice_chroma != 0 ) { | |
|         sps_log2_diff_max_bt_min_qt_intra_slice_chroma | ue(v) |
|         sps_log2_diff_max_tt_min_qt_intra_slice_chroma | ue(v) |
|     } | |
|   } | |

In this embodiment, we first signal syntax element sps_max_mtt_hierarchy_depth_before_minqt_inter_slice.

sps_max_mtt_hierarchy_depth_before_minqt_inter_slice specifies the default maximum hierarchy depth for coding units resulting from multi-type tree splitting of a quadtree leaf when this quadtree leaf size is not equal to (strictly greater than) MinQtLog2SizeInterY in slices with slice_type equal to 0 (B) or 1 (P) referring to the SPS. When partition_constraints_override_flag is equal to 1, the default maximum hierarchy depth can be overridden by slice_max_mtt_hierarchy_depth_before_minqt_luma present in the slice header of the slices referring to the SPS. The value of sps_max_mtt_hierarchy_depth_before_min_qt_inter_slice shall be in the range of 0 to CtbLog2SizeY−MinCbLog2SizeY, inclusive.

If sps_log2_diff_min_qt_min_cb_inter_slice is not equal to 0, it means that the QT tree will stop before reaching the minimum coded block size, hence we need to use more binary/ternary split to reach the minimum coded block size. Thus this sps_log2_diff_min_qt_min_cb_inter_slice value is a condition for parsing sps_log2_diff_max_hierarchy_depth_after_minqt_intra_slice_luma syntax element.

sps_max_mtt_hierarchy_depth_after_minqt_inter_slice specifies the default maximum hierarchy depth for coding units resulting from multi-type tree splitting of a quadtree leaf when this quadtree leaf size is equal to MinQtLog2SizeInterY in slices with slice_type equal to 0 (B) or 1 (P) referring to the SPS. When partition_constraints_override_flag is equal to 1, the default maximum hierarchy depth can be overridden by slice_max_mtt_hierarchy_depth_after_minqt_luma present in the slice header of the slices referring to the SPS. The value of sps_max_mtt_hierarchy_depth_after_min_qt_inter_slice shall be in the range of 0 to CtbLog2SizeY−MinCbLog2SizeY, inclusive.

The same principle applies to intra_slice_luma and intra_slice_chroma.

The previous embodiments may be used separately or in combination. For example, the embodiment that doubles the hierarch depth as described before is combined with the embodiment as described in Table 11. This typically means the maximum mtt hierarchy depth is doubled compared to its maximum allowed value in VVC draft 6. This takes the following form.

The value sps_max_mtt_hierarchy_depth_before_minqt_inter_slice range is 0 (no split allowed) to 2*(CtbLog2SizeY−MinCbLog2SizeY).

The value sps_max_mtt_hierarchy_depth_before_minqt_intra_slice_luma range is 0 (no split allowed) to 2*(CtbLog2SizeY−MinCbLog2SizeY).

The value of sps_max_mtt_hierarchy_depth_after_minqt_inter_slice range is changed from 0 (no split allowed) to 2*(MinQtLog2SizeY−MinCbLog2SizeY).

The value of sps_max_mtt_hierarchy_depth_after_minqt_intra_slice_luma range is changed from 0 (no split allowed) to 2*(MinQtLog2SizeY−MinCbLog2SizeY).

The value of sps_max_mtt_hierarchy_depth_before_minqt_intra_slice_chroma range is changed from 0 (no split allowed) to 2*(MinQtLog2SizeY−MinCbLog2SizeY).

The value of sps_max_mtt_hierarchy_depth_after_minqt_intra_slice_chroma range is changed from 0 (no split allowed) to 2*(MinQtLog2SizeY−MinCbLog2SizeY).

In one example, we can define a split tree as shown in Table 12.

TABLE 12

Maximum MTT depth for each size when QT is enabled and disabled

| CU size | QT split allowed? | Max MTT depth |
|---|---|---|
| 128, 64, 32 | Yes | 2 |
| 16, 8, 4 | No | 4 |

Maximum Value for log2_min_luma_coding_block_size_minus2 Syntax Element

In this embodiment, sps_max_luma_transform_size_64_flag syntax element is moved after log2_ctu_size_minus5 and before log2_min_luma_coding_block_size_minus2, as shown in Table 13.

TABLE 13 proposed syntax table for maximum value
signaling for log2_min_luma_coding_
block_size_minus2

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   ... | |
|   if( ChromaArrayType != 0 ) | |
|     qtbtt_dual_tree_intra_flag | u(1) |
|   log2_ctu_size_minus5 | u(2) |
|   <u>sps_max_luma_transform_size_64_flag</u> | <u>u(1)</u> |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
| } | |
| ~~sps_max_luma_transform_size_64_flag~~ | ~~u(1)~~ | sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTbLog2SizeY, MaxTbLog2SizeY, MinTbSizeY, and MaxTbSizeY are derived as follows:

$$MinTbLog2SizeY=2 \quad (7\text{-}27)$$

$$MaxTbLog2SizeY=sps\_max\_luma\_transform\_size\_64\_flag?6: 5 \quad (7\text{-}28)$$

$$MinTbSizeY=1<<MinTbLog2SizeY$$

$$MaxTbSizeY=1<<MaxTbLog2SizeY \quad (7\text{-}29)$$

log2_min_luma_coding_block_size_minus2 plus 2 specifies the minimum luma coding block size.

In VVC draft 6, no upper bound for the log2_min_luma_coding_block_ size_minus2 syntax element is specified.

The variables CtbLog2SizeY, CtbSizeY, MinCbLog2SizeY, MinCbSizeY, IbcBufWidthY, IbcBufWidthC and Vsize are derived as follows:

$$CtbLog2SizeY=log2\_ctu\_size\_minus5+5 \quad (7\text{-}15)$$

$$CtbSizeY=1<<CtbLog2SizeY \quad (7\text{-}16)$$

$$MinCbLog2SizeY=log2\_min\_luma\_coding\_ block\_size\_minus2+2 \quad (7\text{-}17)$$

$$MinCbSizeY=1<<MinCbLog2SizeY \quad (7\text{-}18)$$

$$IbcBufWidthY=128*128/CtbSizeY \quad (7\text{-}19)$$

$$IbcBufWidthC=IbcBufWidthY/SubWidthC \quad (7\text{-}20)$$

$$VSize=Min(64,CtbSizeY) \quad (7\text{-}21)$$

The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

$$CtbWidthC=CtbSizeY/SubWidthC \quad (7\text{-}22)$$

$$CtbHeightC=CtbSizeY/SubHeightC \quad (7\text{-}23)$$

Figure 12:
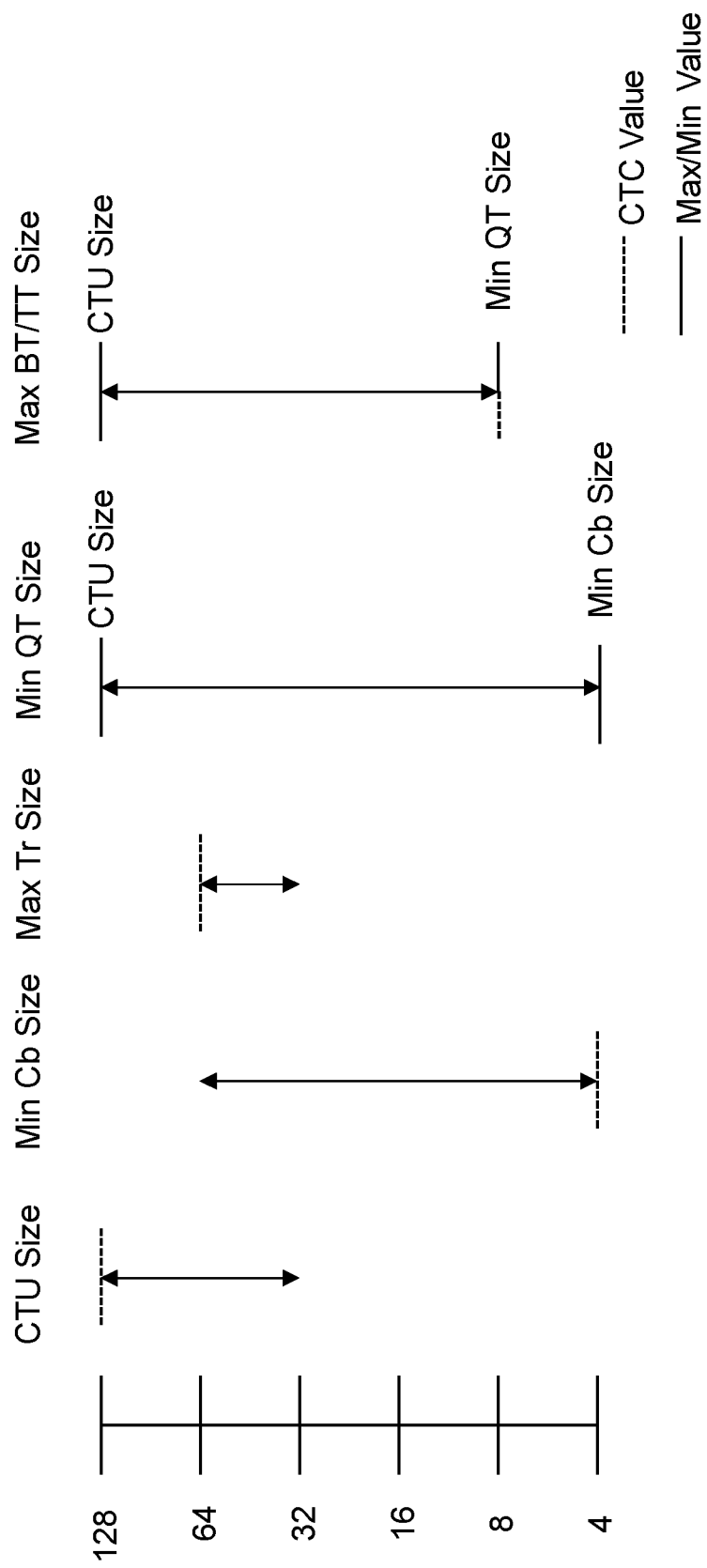
FIG. 12 illustrates the modified maximum allowed value of the minimum coded block size, based on the maximum transform size allowed, according to an embodiment.

The proposed modification to the specification of the allowed range for the syntax element log2_min_luma_coding_block_size_minus2 is illustrated by FIG. 12. As can be seen from FIG. 12, the allowed range for the minimum coded block size goes from 4 to the maximum transform size in this embodiment.

According to an alternative way to specify the bounds of the syntax element log2_min_luma_coding_block_size_minus2, it is proposed to specify the maximum possible value for log2_min_luma_coding_block_size_minus2 based on the CTU size.

Thus, here the value of log2_min_luma_coding_block_size_minus2 shall be in the range of 0 to (CtbLog2SizeY−2). This ensures that each coded block has a size at most equal to the CTU size. It can be larger than the maximum transform size. In such case, the VVC specification already mentions that a coded block whose size is larger than the maximum transform size, and which is not split into sub coding units, shall be tiled into transform units in order to code/decode its residual data.

Figure 13:
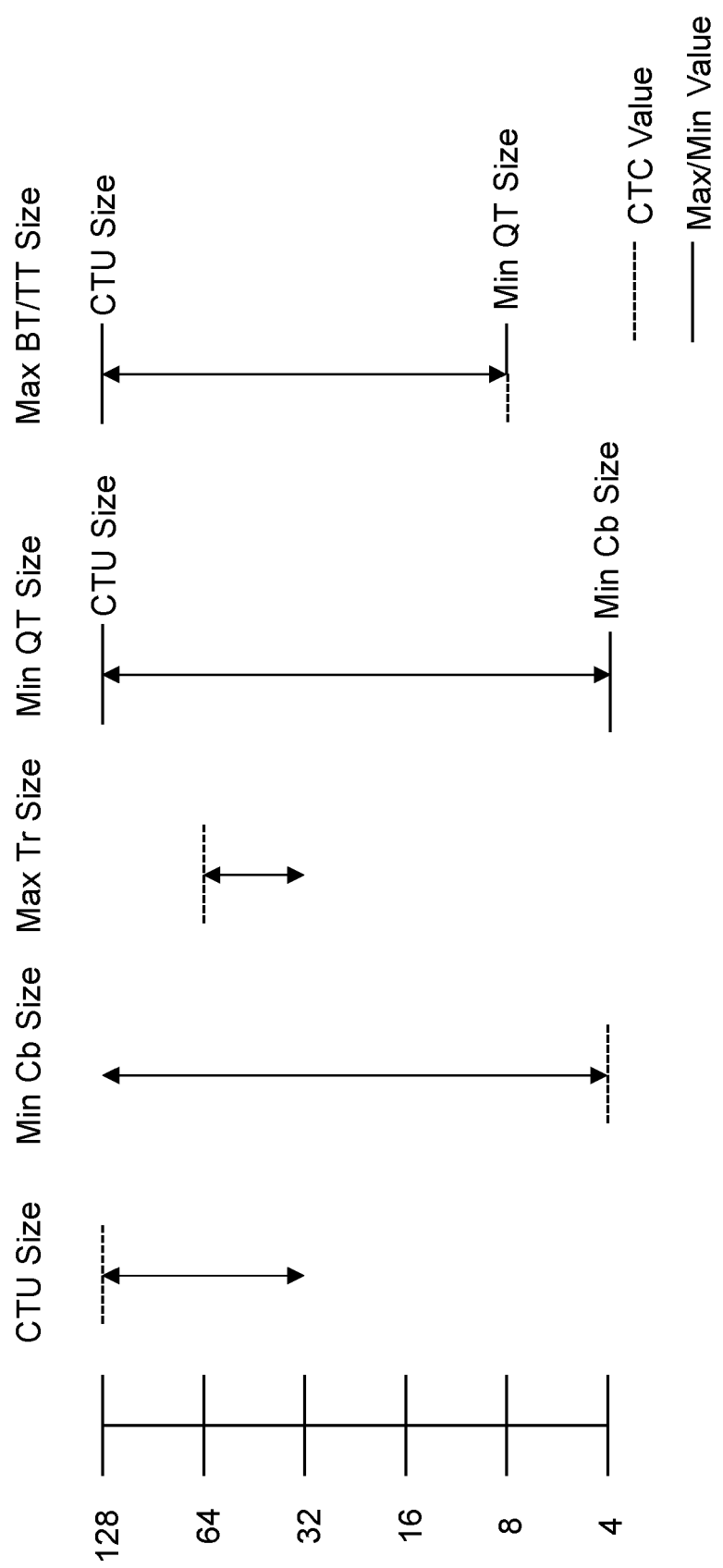
FIG. 13 illustrates the modified maximum allowed value of the minimum coded block size, based on the CTU size, according to another embodiment.

The proposed modification to the specification of the allowed range for the syntax element log2_min_luma_coding_block_size_minus2 is illustrated by FIG. 13. As can be seen, the allowed range for the minimum coded block size goes from 4 to the CTU size in this embodiment.

According to a further embodiment to specify the bounds of the syntax element log2_min_luma_coding_block_size_minus2, it is proposed to specify the maximum possible value for log2_min_luma_coding_block_size_minus2 based on the CTU size and the Virtual Pipeline Decoding Unit (VPDU) size. The VPDU represent the decoding unit assumed in a hardware implementation of a VVC decoder. The VVC decoding process is designed in such a way that each 64×64 picture area, all the luma and chroma data in that picture area can be fully decoded and reconstructed before starting to decode and reconstruct a next 64×64 area in the considered picture.

In this embodiment, the value of log2_min_luma_coding_block_size_minus2 shall be in the range of 0 to (min(CtbLog2SizeY,6)−2)). In other words, the minimum coded block size shall be in the range 0 to min(CtbSizeY,64), which is precisely equal to the variable VSize (VPDU size) specified in VVC draft 6.

The advantage of this embodiment is the following one. According to VVC draft 6 specification, the CtbSize may be equal to 128 and the minimum coded block size (MinCbSizeY) may be equal to 128 as well. With the proposed constraint on the minimum coding block size based on the VPDU size, each 128×128 CTU has to be split into 4 64×64 luma CU in the luma component. Synchronously with this, the 64×64 chroma block which corresponds to the 128×128 luma CTU has be to split into 4 32×32 chroma CU. Consequently, the coding block size would conform to the VPDU constraint.

The present embodiment solves the above described problem in an alternative way to the preceding embodiment that aligns the upper bound of the minimum block size to the maximum transform size.

Compacted Slice-Level Partition Constraint Overriding

Another embodiment of the present disclosure consists in making the coding of the slice-header partition information coding more compact than in VVC draft 6.

In VVC draft 6, a slice header flag partition_constraints_override_flag is coded to indicate that the coding tree configuration, which is signaled in the Sequence Parameter Set, is being overridden in the considered slice. If this overriding flag is true, then the parameters related to the minimum quad-tree node size, the maximum BT size, the maximum TT size, and the maximum MTT hierarchy depth level are signaled in the slice header. They are coded respectively for the luma component of the considered slice, and also the chroma component in case the dual tree coding is active.

However, in the VTM6 encoder strategy, some of these coding tree parameters are being changed in some slices, but some other are never changed. Therefore, for some particular encoding strategies, the VVC draft 6 slice header syntax specification may lead to the repetition of redundant data. Typically, the maximum MTT hierarchy depth information is never changed.

In this embodiment, it is proposed to signal a flag max_mtt_hierarchy_depth_override_flag that indicates if the maximum hierarchy depth parameter(s) are being overridden in the slice header. If so then the slice-level maximum hierarchy depth information is coded in the slice header. Otherwise the slice-level maximum hierarchy depth values are set equal to those of the SPS, respectively for luma component and for chroma component (case of dual tree). In addition, the slice-level coding of the maximum BT size and maximum MTT size, under the form of the syntax elements slice_log2_diff_max_bt_min_qt_luma and slice_log2_diff_max_tt_min_qt_luma, no more depends on the value of the maximum MTT hierarchy depth as is the case in VVC draft 6. This dependency is also removed for the chroma component, in case of dual tree coding. The proposed slice header syntax modification is illustrated by the table below. The advantage of the present embodiment is a more compact slice header syntax, leading to up to 0.1% bitrate saving for small video sequences where the over-header linked to the high-level syntax is not negligible.

TABLE 14 slice header syntax modification proposed in the present embodiment

| | Descriptor |
|---|---|
| sliceheader( ) { | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       ~~slice_max_mtt_hierarchy_depth_luma~~ | ~~ue(v)~~ |
|       ~~if(slice_max_mtt_hierarchy_depth_luma!=0)~~ | |
|       slice_log2_diff_max_bt_min_qt_luma | ue(v) |
|       slice_log2_diff_max_tt_min_qt_luma | ue(v) |
|     ~~}~~ | |
|     max_mtt_hierarchy_depth_override_flag | u(1) |
|     if( max_mtt_hierarchy_depth_override_flag ) { | |
|       slice_max_mtt_hierarchy_depth_luma | ue(v) |
|     } | |
|     if( slice_type = = I && qtbtt_dual_tree_intra_flag ) | |
|     { | |
|       slice_log2_diff_min_qt_min_cb_chroma | ue(v) |

TABLE 14-continued slice header syntax modification proposed in the present embodiment

| | Descriptor |
|---|---|
| ~~slice_max_mtt_hierarchy_depth_chroma~~ | ~~ue(v)~~ |
| ~~if(slice_max_mtt_hierarchy_depth_chroma!=0)~~ | |
|     slice_log2_diff_max_bt_min_qt_chroma | ue(v) |
|     slice_log2_diff_max_tt_min_qt_chroma | ue(v) |
|   ~~}~~ | |
|   if( max_mtt_hierarchy_depth_override_flag ) { | |
|     <u>slice max mtt hierarchy depth chroma</u> | <u>ue(v)</u> |
|   } | |
|   } | |
| } | |
| } | |
| byte_alignment( ) | |
| } | |

According to a further variant of the present embodiment, the minimum quad-tree node size information, which is equivalent to the maximum quad-tree depth, is also coded on the slice level based on the flag maximum_hierarchy_depth_override_flag which is signaled before in the slice header. Hence, this flag maximum_hierarchy_depth_override controls the signaling of the minimum QT size, and maximum MTT hierarchy depth parameters. The advantage of this variant is a further compacted slice header compared to VVC draft 6.

TABLE 15 further compacted slice header syntax proposed

| | Descriptor |
|---|---|
| slice_header( ) { | |
|   if( partition_constraints_override_enabled_flag ) { | |
|     partition_constraints_override_flag | ue(v) |
|     if( partition_constraints_override_flag ) { | |
|       ~~slice_log2_diff_min_qt_min_cb_luma~~ | ~~ue(v)~~ |
|       ~~slice_max_mtt_hierarchy_depth_luma~~ | ~~ue(v)~~ |
| ~~if(slice_max_mtt_hierarchy_depth_luma!=0)~~ | |
|       slice_log2_diff_max_bt_min_qt_luma | ue(v) |
|       slice_log2_diff_max_tt_min_qt_luma | ue(v) |
|     ~~}~~ | |
|     <u>max hierarchy depth override flag</u> | <u>u(1)</u> |
|     <u>If( max hierarchy depth override flag ) {</u> | |
|       <u>slice log2 diff min qt min cb luma</u> | <u>ue(v)</u> |
|       <u>slice max mtt hierarchy depth luma</u> | <u>ue(v)</u> |
|     } | |
|     if( slice_type = = I && qtbtt_dual_tree_intra_flag ) | |
|     { | |
|       ~~slice_log2_diff_min_qt_min_cb_chroma~~ | ~~ue(v)~~ |
|       ~~slice_max_mtt_hierarchy_depth_chroma~~ | ~~ue(v)~~ |
| ~~if(slice_max_mtt_hierarchy_depth_chroma!=0)~~ | |
|       slice_log2_diff_max_bt_min_qt_chroma | ue(v) |
|       slice_log2_diff_max_tt_min_qt_chroma | ue(v) |
|     ~~}~~ | |
|     if( max_hierarchy_depth_override_flag ) { | |
|       <u>slice log2 diff min qt min cb chroma</u> | <u>ue(v)</u> |
|       <u>slice_max_mtt_hierarchy_depth_chroma</u> | <u>ue(v)</u> |
|     } | |
|     } | |
|   } | |
| } | |
| byte_alignment( ) | |
| } | |

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the partitioning, entropy encoding and decoding modules (202, 335, 245, 330), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names. In the above, the syntax elements for SPS and SH are mainly used to illustrate various embodiments. It should be noted that these syntax elements can be placed in other syntax structures.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
    decoding a value indicating a maximum allowed depth of a tree structure, wherein said maximum allowed depth is bounded by twice the difference of a first value and a second value, said first value indicating a size of a largest allowed coding block, and said second value indicating a minimum allowed coding block size; and
    partitioning a node representing said largest allowed coding block or a partition of said largest allowed coding block, by said tree structure into coding blocks, wherein said tree structure uses a quadtree followed by at least one of horizontal binary splitting, vertical binary splitting, horizontal ternary splitting, and vertical ternary splitting.

2. The method of claim 1, further comprising:
    partitioning said largest allowed coding block by a quadtree structure into quadtree leaf nodes, said quadtree leaf nodes including said node representing said partition of said largest allowed coding block.

3. The method of claim 1, wherein said first value corresponds to a base-2 logarithm of said size of said largest allowed coding block.

4. The method of claim 1, wherein said second value corresponds to a base-2 logarithm of said minimum allowed coding block size.

5. An apparatus, comprising at least a memory and one or more processors, wherein said one or more processors are configured to:
    decode a value indicating a maximum allowed depth of a tree structure, wherein said maximum allowed depth is bounded by twice the difference of a first value and a second value, said first value indicating a size of a largest allowed coding block, and said second value indicating a minimum allowed coding block size; and
    partition a node representing said largest allowed coding block or a partition of said largest allowed coding block, by said tree structure into coding blocks, wherein said tree structure uses a quadtree followed by at least one of horizontal binary splitting, vertical binary splitting, horizontal ternary splitting, and vertical ternary splitting.

6. The apparatus of claim 5, wherein said one or more processors are further configured to:
    partition said largest allowed coding block by a quadtree structure into quadtree leaf nodes, said quadtree leaf nodes including said node representing said partition of said largest allowed coding block.

7. The apparatus of claim 5, wherein said first value corresponds to a base-2 logarithm of said size of said largest allowed coding block.

8. The apparatus of claim 5, wherein said second value corresponds to a base-2 logarithm of said minimum allowed coding block size.

9. A method, comprising:
encoding a value indicating a maximum allowed depth of a tree structure, wherein said maximum allowed depth is bounded by twice the difference of a first value and a second value, said first value indicating a size of a largest allowed coding block, and said second value indicating a minimum allowed coding block size; and
partitioning a node representing said largest allowed coding block or a partition of said largest allowed coding block, by said tree structure into coding blocks, wherein said tree structure uses a quadtree followed by at least one of horizontal binary splitting, vertical binary splitting, horizontal ternary splitting, and vertical ternary splitting.

10. The method of claim 9, further comprising:
partitioning said largest allowed coding block by a quadtree structure into quadtree leaf nodes, said quadtree leaf nodes including said node representing said partition of said largest allowed coding block.

11. The method of claim 9, wherein said first value corresponds to a base-2 logarithm of said size of said largest allowed coding block.

12. The method of claim 9, wherein said second value corresponds to a base-2 logarithm of said minimum allowed coding block size.

13. An apparatus, comprising at least a memory and one or more processors, wherein said one or more processors are configured to:
encode a value indicating a maximum allowed depth of a tree structure, wherein said maximum allowed depth is bounded by twice the difference of a first value and a second value, said first value indicating a size of a a largest allowed coding block, and said second value indicating a minimum allowed coding block size; and
partition a node representing said largest allowed coding block or a partition of said largest allowed coding block, by said tree structure into coding blocks, wherein said tree structure uses a quadtree followed by at least one of horizontal binary splitting, vertical binary splitting, horizontal ternary splitting, and vertical ternary splitting.

14. The apparatus of claim 13, wherein said one or more processors are further configured to:
partition said largest allowed coding block by a quadtree structure into quadtree leaf nodes, said quadtree leaf nodes including said node representing said partition of said largest allowed coding block.

15. The apparatus of claim 13, wherein said first value corresponds to a base-2 logarithm of said size of said largest allowed coding block.

16. The apparatus of claim 13, wherein said second value corresponds to a base-2 logarithm of said minimum allowed coding block size.

* * * * *